US010235799B2

(12) United States Patent
Nevraev et al.

(10) Patent No.: US 10,235,799 B2
(45) Date of Patent: Mar. 19, 2019

(54) VARIABLE RATE DEFERRED PASSES IN GRAPHICS RENDERING

(71) Applicant: Microsoft Technology Licensing, LLC, Redmond, WA (US)

(72) Inventors: Ivan Nevraev, Redmond, WA (US); Martin J. I. Fuller, Warwick (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/639,253

(22) Filed: Jun. 30, 2017

(65) Prior Publication Data

US 2019/0005713 A1    Jan. 3, 2019

(51) Int. Cl.
G06T 17/10    (2006.01)
G06T 15/80    (2011.01)
G06T 15/00    (2011.01)

(52) U.S. Cl.
CPC ............ G06T 15/80 (2013.01); G06T 15/005 (2013.01); G06T 17/10 (2013.01)

(58) Field of Classification Search
CPC ............................... G06T 17/20; G06T 19/00
USPC ......................................................... 345/420
See application file for complete search history.

(56) References Cited

U.S. PATENT DOCUMENTS

| 6,977,649 | B1 | 12/2005 | Baldwin et al. |
| 7,023,437 | B1 | 4/2006 | Voorhies et al. |
| 8,223,157 | B1 | 7/2012 | Baldwin et al. |
| 9,305,324 | B2 | 4/2016 | McGuire et al. |
| 2010/0001999 | A1* | 1/2010 | Everitt .................... G06T 11/40 345/426 |
| 2013/0271465 | A1* | 10/2013 | Clarberg ................. G06T 15/80 345/426 |
| 2015/0022537 | A1* | 1/2015 | Lum ....................... G06T 11/40 345/522 |
| 2015/0317827 | A1* | 11/2015 | Crassin .................... G06T 1/60 345/426 |
| 2016/0005216 | A1* | 1/2016 | Lee ....................... G06T 15/005 345/422 |
| 2016/0049000 | A1* | 2/2016 | Patney .................... G06T 15/80 345/426 |
| 2016/0078672 | A1 | 3/2016 | Sathe et al. |
| 2016/0148420 | A1* | 5/2016 | Ha ......................... G06T 15/50 345/426 |

(Continued)

OTHER PUBLICATIONS

Liktor, G., and Dachsbacher, C. 2012. Decoupled Deferred Shading for Hardware Rasterization. In Symposium on Interactive 3D Graphics and Games, 143-150.*

(Continued)

Primary Examiner — Jin Ge
(74) Attorney, Agent, or Firm — Arent Fox LLP (57) ABSTRACT

Methods and devices for performing pixel shading in graphics processing are described. Multiple primitives of an image can be shaded at one or more variable shading rates. A subset of pixels, in at least one screen-space tile corresponding to a portion of the image, corresponding to samples that are shaded in the shading at the one or more variable shading rates, can be determined. One or more deferred passes can be applied to the subset of pixels in the at least one screen-space tile to provide additional shading of the subset of pixels. After completing the deferred passes, the set of pixels not processed by the deferred passes can be filled using adjacent shaded pixels.

20 Claims, 5 Drawing Sheets

(56) References Cited

U.S. PATENT DOCUMENTS

| | | |
|---|---|---|
| 2016/0284119 A1 | 9/2016 | Surti et al. |
| 2017/0124757 A1* | 5/2017 | Sathe .................... G06T 15/005 |
| 2017/0161940 A1* | 6/2017 | Liktor .................... G09G 5/363 |
| 2018/0061122 A1* | 3/2018 | Clarberg ................ G06T 15/80 |

OTHER PUBLICATIONS

Clarberg, et al., "A Sort-based Deferred Shading Architecture for Decoupled Sampling", In Proceedings of ACM Transactions on Graphics, vol. 32, No. 4, Jul. 2013, 10 pages.

Ragan-Kelley, et al., "Decoupled Sampling for Graphics Pipelines", In Journal of ACM Transactions on Graphics, vol. 30, Issue 3, May 2011, pp. 1-17.

* cited by examiner

VARIABLE RATE DEFERRED PASSES IN GRAPHICS RENDERING

BACKGROUND

The present examples relate to a computer device, and more particularly, to performing variable sample rate shading in rendering graphics on a computer device.

Computer graphics systems, which can render 2D objects or objects from a 3D world (real or imaginary) onto a two-dimensional (2D) display screen, are currently used in a wide variety of applications. For example, 3D computer graphics can be used for real-time interactive applications, such as video games, virtual reality, scientific research, etc., as well as off-line applications, such as the creation of high resolution movies, graphic art, etc. Typically, the graphics system includes a graphics processing unit (GPU). A GPU may be implemented as a co-processor component to a central processing unit (CPU) of the computer, and may be provided in the form of an add-in card (e.g., video card), co-processor, or as functionality that is integrated directly into the motherboard of the computer or into other devices, such as a gaming device.

Typically, the GPU has a "logical graphics pipeline," which may accept as input some representation of a 2D or 3D scene and output a bitmap that defines a 2D image for display. For example, the DIRECTX collection of application programming interfaces by MICROSOFT CORPORATION, including the DIRECT3D API, is an example of APIs that have graphic pipeline models. Another example includes the Open Graphics Library (OPENGL) API. The graphics pipeline typically includes a number of stages to convert a group of vertices, textures, buffers, and state information into an image frame on the screen. For instance, one of the stages of the graphics pipeline is a shader. A shader is a piece of code running on a specialized processing unit, also referred to as a shader unit or shader processor, usually executing multiple data threads at once, programmed to generate appropriate levels of color and/or special effects to fragments being rendered. In particular, for example, a vertex shader processes traits (position, texture coordinates, color, etc.) of a vertex, and a pixel shader processes traits (texture values, color, z-depth and alpha value) of a pixel.

In forward rendering, the shaders perform all steps for shading each primitive in the image while rasterizing the primitives to a set of pixels of the final image. Deferred rendering can be employed to delay one or more shading steps or passes typically performed by a pixel shader for each primitive to instead occur after rasterizing the primitives. For example, in deferred rendering, a geometry pass can be performed to generate one or more intermediate render targets, including, for example, position, normal, specular, intensity, etc. Then, additional separate passes can be performed (e.g., lighting, screen space effects such as ambient occlusion, reflections, sub surface scattering, shadow accumulation, etc.) for the pixels in the image based on the one or more intermediate render targets. This approach is typically more efficient, as when shading primitives, the shaded values may subsequently be overwritten by another primitive.

Deferred rendering typically performs the one or more deferred passes for each pixel in the image. Some mechanisms have been proposed to reduce the number of pixels for which deferred rendering is performed to achieve more efficient rendering. For example, some mechanisms include reducing resolution to a lesser number of pixels (and thus a lesser number of pixels to shade in the deferred rendering step), interlaced rendering where alternating lines are rendered in a given screen refresh (thus decreasing the number of pixels that are rendered/shaded to half for the screen refresh), or using a checkerboard rendering pattern where blocks of pixels are rendered or not in a checkboard pattern in a given screen refresh. These are naive solutions that reduce resolution across the screen, which can thereby result in unsatisfactory image quality.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

One example relates to a method for performing pixel shading in graphics processing. The method includes shading, by a graphic processing unit (GPU) and at one or more variable shading rates, multiple primitives of an image, determining, by the GPU, a subset of pixels, in at least one screen-space tile corresponding to a portion of the image, corresponding to samples that are shaded in the shading at the one or more variable shading rates, where the subset of pixels is less than or equal to all pixels in at least one screen-space tile, applying, by the GPU, one or more deferred passes to the subset of pixels in the at least one screen-space tile to provide additional shading of the subset of pixels, and generating, by the GPU, a portion of a render target corresponding to the at least one screen-space tile having the one or more deferred passes applied.

In another example, a computer device includes a memory and a GPU in communication with the memory. The GPU is configured to shade, at one or more variable shading rates, multiple primitives of an image, determine a subset of pixels, in at least one screen-space tile corresponding to a portion of the image, corresponding to samples that are shaded in the shading at the one or more variable shading rates, wherein the subset of pixels is less than or equal to all pixels in the at least one screen-space tile, apply one or more deferred passes to the subset of pixels in the at least one screen-space tile to provide additional shading of the subset of pixels, and generate a portion of a render target corresponding to the at least one screen-space tile having the one or more deferred passes applied.

In a further example, a computer-readable medium storing computer-executable instructions executable by a processor for rendering graphics in a computer device includes various instructions. The computer-readable medium includes instructions for shading, by a GPU and at one or more variable shading rates, multiple primitives of an image, instructions for determining, by the GPU, a subset of pixels, in at least one screen-space tile corresponding to a portion of the image, corresponding to samples that are shaded in the shading at the one or more variable shading rates, wherein the subset of pixels is less than or equal to all pixels in the at least one screen-space tile, instructions for applying, by the GPU, one or more deferred passes to the subset of pixels in the at least one screen-space tile to provide additional shading of the subset of pixels, and instructions for generating, by the GPU, a portion of a render target corresponding to the at least one screen-space tile having the one or more deferred passes applied.

Additional advantages and novel features relating to examples of the present invention will be set forth in part in the description that follows, and in part will become more apparent to those skilled in the art upon examination of the following or upon learning by practice thereof.

DETAILED DESCRIPTION

The described solutions provide a graphical processing unit (GPU) with a flexible, dynamic mechanism that provides variable rate deferred passes in deferred rendering of images. For example, the GPU can determine subsets of pixels in an image that are shaded in a pass of a pixel shader for shading one or more primitives in an image, and can perform one or more deferred passes over the subset of pixels without necessarily performing deferred passes over other pixels in the image that are not in the subset. In an example, the GPU can determine to apply variable rate shading to one or more primitives in the image, which can include determining shading parameters for a set of pixels corresponding to the one or more primitives, and accordingly performing shading of at least a portion of the set of pixels based on the shading parameters. Depending on the shading rate, however, a subset of the set of pixels may actually be modified while another subset of the set of pixels are not modified (or are copies of the modified set of pixels, a process often referred to as "broadcasting") as part of the variable rate shading process.

Thus, in an example, based on performing the variable rate shading, coordinate locations of the subset of pixels that are modified, or other identifying information, can be recorded (e.g., as the pixels are shaded). The information regarding the subset of pixels can be provided to one or more deferred pass stages or processes for applying one or more deferred passes to the subset of modified pixels without necessarily applying the one or more deferred passes to other (e.g., unmodified, or merely broadcasted) pixels. In other words, efficiency and accuracy in performing the deferred passes can be achieved by applying the deferred passes to the subset of modified pixels that are shaded (e.g., also referred to as samples, shaded samples, or anchor pixels) as opposed to applying the deferred passes on all pixels or other naive reduction in the set or pattern of pixels, etc., as described.

Figure 1:
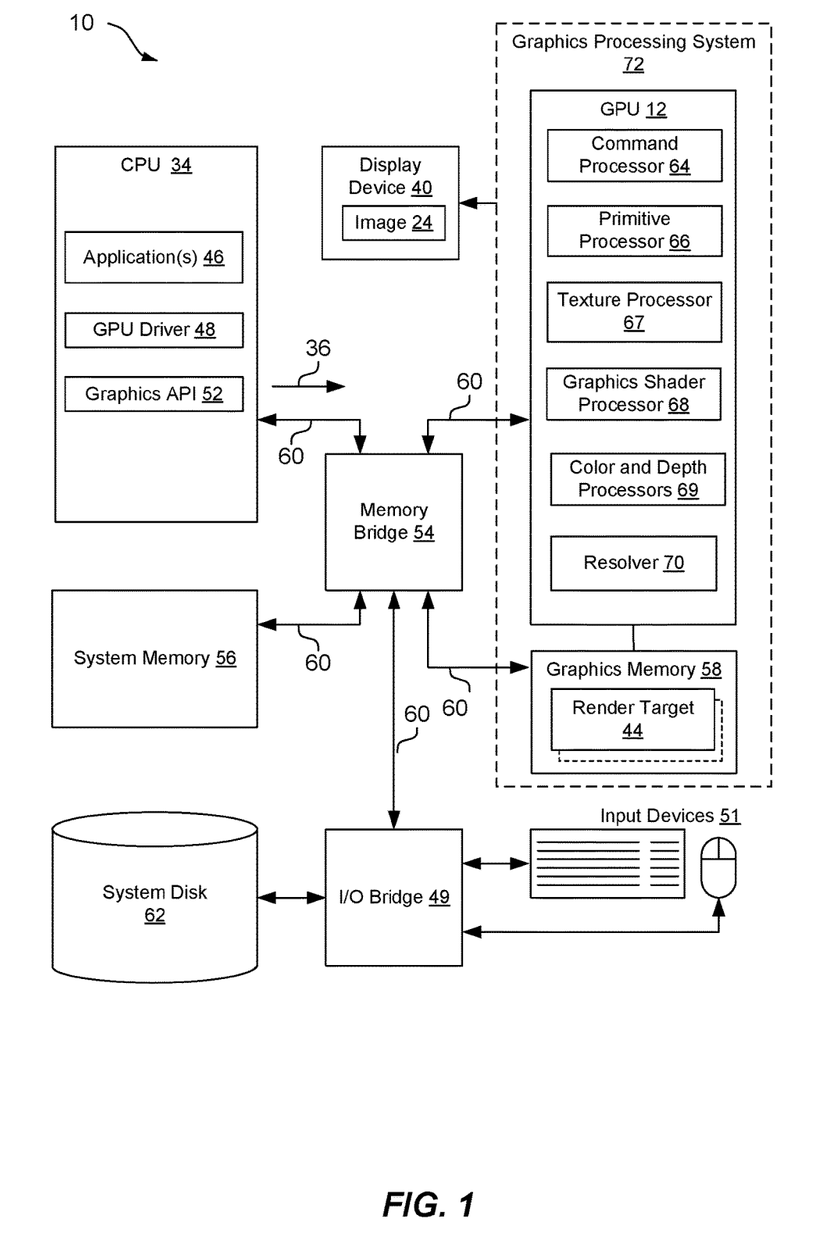
FIG. 1 is a schematic block diagram of an example architecture of a computer device including a graphics processing unit and a graphics pipeline configured according to the described examples.

Referring to FIG. 1, in one example, a computer device 10 includes a graphics processing unit (GPU) 12 configured to implement the described features of performing deferred rendering based on a subset of pixel values produced by variable rate shading. For example, GPU 12 is configured to determine and use information from variable rate shading to determine a subset of pixels over which to perform one or more additional deferred passes (e.g., lighting, screen space effects such as ambient occlusion, reflections, sub surface scattering, shadow accumulation, etc.) in generating an image. For example, GPU 12 can determine to apply the deferred passes over the subset of the pixels (e.g., as opposed to all pixels) where the subset of the pixels (e.g., anchor pixels) can be determined based on known information of pixels modified (or shaded) in an earlier pixel shader stage.

For example, in one implementation, computer device 10 includes a CPU 34, which may be one or more processors that are specially-configured or programmed to control operation of computer device 10 according to the described examples. For instance, a user may provide an input to computer device 10 to cause CPU 34 to execute one or more software applications 46. Software applications 46 that execute on CPU 34 may include, for example, but are not limited to one or more of an operating system, a word processor application, an email application, a spread sheet application, a media player application, a video game application, a graphical user interface application or another program. Additionally, CPU 34 may include a GPU driver 48 that can be executed for controlling the operation of GPU 12. The user may provide input to computer device 10 via one or more input devices 51 such as a keyboard, a mouse, a microphone, a touch pad or another input device that is coupled to computer device 10 via an input/output bridge 49, such as but not limited to a southbridge chipset or integrated circuit.

The software applications 46 that execute on CPU 34 may include one or more instructions that executable to cause CPU 34 to issue one or more graphics commands 36 to cause the rendering of graphics data associated with an image 24 on display device 40. The image 24 may comprise, for example, one or more objects, and each object may comprise one or more primitives, as explained in more detail below. For instance, in some implementations, the software application 46 places graphics commands 36 in a buffer in the system memory 56 and the command processor 64 of the GPU 12 fetches them. In some examples, the software instructions may conform to a graphics application programming interface (API) 52, such as, but not limited to, a DirectX and/or Direct3D API, an Open Graphics Library (OpenGL®) API, an Open Graphics Library Embedded Systems (OpenGL ES) API, an X3D API, a RenderMan API, a WebGL API, a Vulkan API, a Metal API, or any other public or proprietary standard graphics API. In order to process the graphics rendering instructions, CPU 34 may issue one or more graphics commands 36 to GPU 12 (e.g., through GPU driver 48) to cause GPU 12 to perform some or all of the rendering of the graphics data. In some examples, the graphics data to be rendered may include a list of graphics primitives, e.g., points, lines, triangles, quadrilaterals, triangle strips, etc.

Computer device 10 may also include a memory bridge 54 in communication with CPU 34 that facilitates the transfer of data going into and out of system memory 56 and/or graphics memory 58. For example, memory bridge 54 may receive memory read and write commands, and service such commands with respect to system memory 56 and/or graphics memory 58 in order to provide memory services for the components in computer device 10. Memory bridge 54 is communicatively coupled to GPU 12, CPU 34, system memory 56, graphics memory 58, and input/output bridge 49 via one or more buses 60. In an example, for example, memory bridge 54 may be a northbridge integrated circuit or chipset.

System memory 56 may store program modules and/or instructions that are accessible for execution by CPU 34 and/or data for use by the programs executing on CPU 34. For example, system memory 56 may store the operating system application for booting computer device 10. Further, for example, system memory 56 may store a window manager application that is used by CPU 34 to present a graphical user interface (GUI) on display device 40. In addition, system memory 56 may store user applications 46 and other information for use by and/or generated by other components of computer device 10. For example, system memory 56 may act as a device memory for GPU 12 (although, as illustrated, GPU 12 may generally have a direct connection to its own graphics memory 58) and may store data to be operated on by GPU 12 as well as data resulting from operations performed by GPU 12. For example, system memory 56 may store any combination of texture buffers, depth buffers, stencil buffers, vertex buffers, frame buffers, or the like. System memory 56 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

Additionally, in an example, computer device 10 may include or may be communicatively connected with a system disk 62, such as a CD-ROM or other removable memory device. System disk 62 may include programs and/or instructions that computer device 10 can use, for example, to boot operating system in the event that booting operating system from system memory 56 fails. System disk 62 may be communicatively coupled to the other components of computer device 10 via input/output bridge 49.

As discussed above, GPU 12 may be configured to perform graphics operations to render one or more render targets 44 (e.g., based on graphics primitives) to display device 40 to form image 24. For instance, when one of the software applications 46 executing on CPU 34 requires graphics processing, CPU 34 may provide graphics commands and graphics data associated with image 24, along with graphics command 36, to GPU 12 for rendering to display device 40. The graphics data may include, e.g., drawing commands, state information, primitive information, texture information, etc. GPU 12 may include one or more processors, including a command processor 64 for receiving graphics command 36 and initiating or controlling the subsequent graphics processing by at least one primitive processor 66 for assembling primitives, a plurality of graphics shader processors 68 for processing vertex, surface, pixel, and other data for GPU 12, one or more texture processors 67 for generating texture data for fragments or pixels, and one or more color and depth processors 69 for generating color data and depth data and merging the shading output. For example, in an example, primitive processor 66 may implement input assembler and rasterizer stages of a logical graphics pipeline, as is discussed below. GPU 12 may, in some instances, be built with a highly parallel structure that provide more efficient processing of complex graphic-related operations than CPU 34. For example, GPU 12 may include a plurality of processing elements that are configured to operate on multiple vertices or pixels in a parallel manner. The highly parallel nature of GPU 12 may, in some instances, allow GPU 12 to draw graphics image 24, e.g., GUIs and two-dimensional (2D) and/or three-dimensional (3D) graphics scenes, onto display device 40 more quickly than drawing the image 24 directly to display device 40 using CPU 34.

GPU 12 may, in some instances, be integrated into a motherboard of computer device 10. In other instances, GPU 12 may be present on a graphics card that is installed in a port in the motherboard of computer device 10 or may be otherwise incorporated within a peripheral device configured to interoperate with computer device 10. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In an example, GPU 12 may be directly coupled to graphics memory 58. For example, graphics memory 58 may store any combination of index buffers, vertex buffers, texture buffers, depth buffers, stencil buffers, render target buffers, frame buffers, state information, shader resources, constants buffers, coarse shading rate parameter (SRP) maps (e.g., a 2D map of a viewable area at coarse resolution that can be used to look-up an SRP value based on a closest point in the map to the transformed vertex), unordered access view resources, graphics pipeline stream outputs, or the like. As such, GPU 12 may read data from and write data to graphics memory 58 without using bus 60. In other words, GPU 12 may process data locally using storage local to the graphics card, instead of system memory 56. This allows GPU 12 to operate in a more efficient manner by eliminating the need of GPU 12 to read and write data via bus 60, which may experience heavy bus traffic. In some instances, however, GPU 12 may not include a separate memory, but instead may utilize system memory 56 via bus 60. Graphics memory 58 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 34 and/or GPU 12 may store rendered image data, e.g., render targets 44, in a render target buffer of graphic memory 58. It should be noted that the render target buffer also may be an independent memory or may be allocated within system memory 56. GPU 12 may further include a resolver component 70 configured to retrieve the data from a render target buffer of graphic memory 58 and convert multisample data into per-pixel color values to be sent to display device 40 to display image 24 represented by the rendered image data. In some examples, GPU 12 may include a digital-to-analog converter (DAC) that is configured to convert the digital values retrieved from the resolved render target buffer into an analog signal consumable by display device 40. In other examples, GPU 12 may pass the digital values to display device 40 over a digital interface, such as a High-Definition Multi-media Interface (HDMI interface) or a DISPLAYPORT interface, for additional processing and conversion to analog. As such, in some examples, the combination of GPU 12, graphics memory 58, and resolver component 70 may be referred to as a graphics processing system 72.

Display device 40 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display device 40 may be integrated within computer device 10. For instance, display device 40 may be a screen of a mobile telephone. Alternatively, display device 40 may be a stand-alone device coupled to computer device 10 via a wired or wireless communications link. For instance, display device 40 may be a computer monitor or flat panel display connected to a personal computer via a cable or wireless link.

According to one example of the described features, graphics API 52 and GPU driver 48 may configure GPU 12 to execute logical graphics pipeline 14 to perform variable rate shading as described herein.

Figure 2:
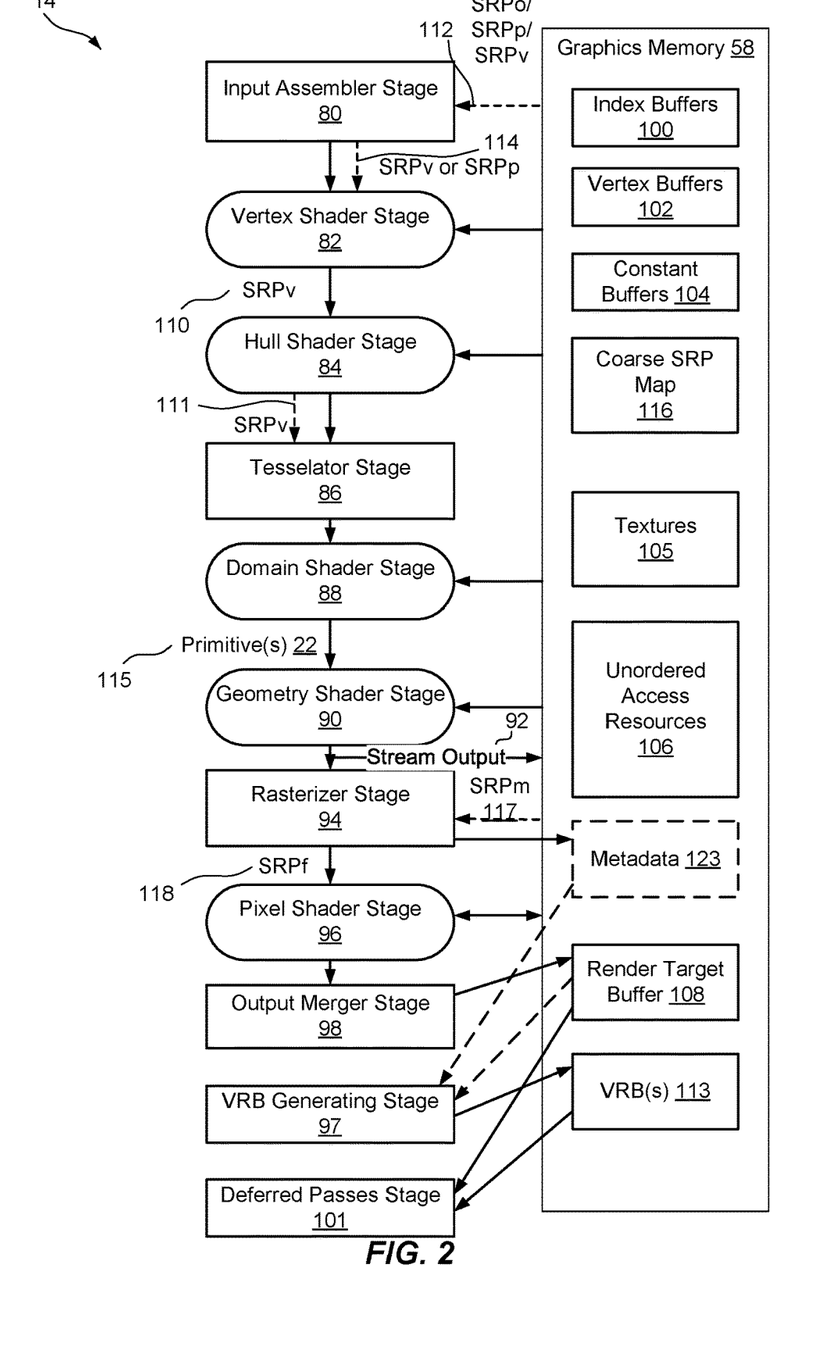
FIG. 2 is a schematic diagram of an example of the graphics pipeline and graphics memory of the computer device of FIG. 1.

Referring to FIG. 2, for instance, in one example, GPU 12 can be configured to implement the stages of an example logical graphics pipeline 14 that may to perform variable rate shading as described herein. In an example, one or more of the various stages may be programmable, for instance, to provide the variable rate deferred passes over a determined subset of modified pixels described herein. Moreover, in an example, common shader cores may be represented by the rounded rectangular blocks. The purpose of each of the example stages in the example logical graphics pipeline 14 is now described in brief below, and additional functionality is further described with respect to subsequent figures. The logical graphics pipeline 14 may include all or a portion of these stages (and/or additional stages) for generating an image.

The input assembler stage 80 supplies data (triangles, lines, points, and indexes) to the pipeline. It also optionally processes shading rate parameters per object (SRPo), per primitive (SRPp), or per vertex (SRPv), generally referenced at 112, as determined by the application 46 (FIG. 1). As generally indicated at 114, input assembler stage 80 may output the SRPp, or an SRPv if the SRPv is not generated by a vertex shader stage 82.

The vertex shader stage 82 processes vertices, typically performing operations such as transformations, skinning, and lighting. Vertex shader stage 82 takes a single input vertex and produces a single output vertex. Also, as indicated at 110, vertex shader stage 82 optionally inputs the per-vertex shading rate parameter (SRPv) or the per-primitive shading rate parameter (SRPp) and typically outputs an SRPv, that is either input or calculated or looked up. It should be noted that, in some implementations, such as when using higher-order surfaces, the SRPv comes from a hull shader stage 84.

The hull shader stage 84, a tessellator stage 86, and a domain-shader 88 stage comprise the tessellation stages— The tessellation stages convert higher-order surfaces to triangles, e.g., primitives, as indicated at 115, for rendering within logical graphics pipeline 14. Optionally, as indicated at 111, hull shader stage 84 can generate the SRPv value for each vertex of each generated primitive (e.g., triangle).

The geometry shader stage 90 optionally (e.g., this stage can be bypassed) processes entire primitives 22. Its input may be a full primitive 22 (which is three vertices for a triangle, two vertices for a line, or a single vertex for a point), a quad, or a rectangle. In addition, each primitive can also include the vertex data for any edge-adjacent primitives. This could include at most an additional three vertices for a triangle or an additional two vertices for a line. The geometry shader stage 90 also supports limited geometry amplification and de-amplification. Given an input primitive 22, the geometry shader stage 90 can discard the primitive, or emit one or more new primitives. Each primitive emitted can output an SRPv for each vertex.

The stream-output stage 92 streams primitive data from graphics pipeline 14 to graphics memory 58 on its way to the rasterizer. Data can be streamed out and/or passed into a rasterizer stage 94. Data streamed out to graphics memory 58 can be recirculated back into graphics pipeline 14 as input data or read-back from the CPU 34 (FIG. 1). This stage may optionally stream out SRPv values to be used on a subsequent rendering pass.

The rasterizer stage 94 clips primitives, prepares primitives for a pixel shader stage 96, and determines how to invoke pixel shaders. Further, as generally indicated at 118, the rasterizer stage 94 can perform coarse scan conversions and determine a per-fragment variable shading rate parameter value (SRPf) (e.g., where the fragment may be a tile, a sub-tile, a quad, a pixel, or a sub-pixel region). Additionally, the rasterizer stage 94 performs fine scan conversions and determines pixel sample positions covered by the fragments. In an example, rasterizer stage 94 can optionally output the pixel sample positions into metadata 123 for use in subsequently determining pixels shaded in a variable rate shading process.

Further, as indicated at 117, the rasterizer stage 94 can also obtain lookup values (SRPm) from coarse SRP map 116. The lookup values correspond to shading rates specified for a larger area, such as a screen space of the image 24 or the entire image 24. Additionally, the rasterizer stage 94 computes SRPf as a function SRPv and the lookup values (SRPm), as described in further detail below. In an example, the rasterizer stage 94 can facilitate deferred rendering or deferred shading for the images based on rasterizing the graphics, and then allowing the shading to be performed in one or more deferred passes over the subset of pixels that are shaded (e.g., anchor pixels as opposed to broadcast pixels) at a deferred passes stage 101, rather than performing shading separately for each primitive when rasterizing.

The pixel shader stage 96 receives interpolated data for primitives and/or fragments and generates per-pixel data, such as color and sample coverage masks, which can include generating one or more render targets 44 for storing in render target buffer 108.

The output merger stage 98 combines various types of pipeline output data (pixel shader values, depth and stencil information, and coverage masks) with the contents of the one or more render targets 44 (FIG. 1) and depth/stencil buffers to generate the final result of graphics pipeline 14.

The variable rate buffer (VRB) generating stage 97 can generate one or more VRB(s) 113 indicating pixels that are shaded during a variable rate shading process performed by the pixel shader stage 96. For example, the one or more VRBs 113 can include an execution control buffer indicating a number of pixels of a screen-space tile that are shaded in the variable rate shading process, a coordinate buffer indicating coordinate locations of the pixels in the screen-space tile, and/or the like. For example, VRB generating stage 97 can generate the VRBs 113 based at least in part on metadata 123 optionally output by the rasterizer stage 94 and/or based at least in part on render targets output by the output merger stage 98 in the render target buffer 108.

The deferred passes stage 101 can perform one or more deferred passes on render targets in the render target buffer 108 based at least in part on the one or more VRBs 113, as described further herein. Thus, deferred passes stage 101 can perform the one or more deferred passes over pixels that are shaded during the variable rate shading, and not necessarily all pixels, to achieve an efficiency in performing the deferred passes.

Also, as discussed above and as illustrated in FIG. 2, graphics pipeline 14 may operate in conjunction with graphics memory 58 for exchanging and storing data. For example, in an example, graphics memory 58 includes one or more vertex buffers 100 that each contains the vertex data used to define geometry of image 24 (or other images). Vertex data includes position coordinates, color data, texture coordinate data, normal data, and so on. The simplest example of vertex buffer 100 is one that only contains position data. More often, vertex buffer 100 contains all the data needed to fully specify 3D vertices. An example of this could be vertex buffer 100 that contains per-vertex position, normal and texture coordinates. This data is usually organized as sets of per-vertex elements.

Further, in an example, graphics memory 58 may include one or more index buffers 102, which contain integer offsets into vertex buffers 100 and are used to render primitives 22 more efficiently. Each index buffer 102 contains a sequential set of indices; each index is used to identify a vertex in a vertex buffer.

Also, in an example, graphics memory 58 may include one or more constant buffers 104 that allows an efficient supply of shader constants, shader data, and/or any other shader resources to graphics pipeline 14. Further, constant buffer 104 can be used to store the results of the stream-output stage 92. Moreover, graphics memory 58 may include one or more texture buffers or textures data 105, such as bitmaps of pixel colors that give an object the appearance of texture.

Additionally, in an example, graphics memory 58 may include one or more unordered access resources 106 (which includes buffers, textures, and texture arrays —without multisampling). Unordered access resources 106 allow temporally unordered read/write access from multiple threads. This means that this resource type can be read/written simultaneously by multiple threads without generating memory conflicts through the use of certain defined functions.

Moreover, in an example, graphics memory 58 may include one or more render target buffers 108, which contain the rendered target or drawing of each pixel 32 of image 24 produced by graphics pipeline 14.

As described in more detail below with respect to the method of operation of graphics pipeline 14 according to the described apparatus and methods, input assembler stage 80 and/or vertex shader stage 82 are configured to determine an SRP value per vertex (SRPv) 110 for each vertex of each primitive 22 of image 24. For example, SRPv value 110 may be determined for each vertex based on one or more SRP values per object (SRPo), SRP values per primitive (SRPp), or SRPp values supplied by application 46 (FIG. 1), e.g., at 112, and/or determined by input assembler stage 80, e.g., at 114, or based on a coarse SRP map 116. Further, rasterizer stage 94 may interpolate and quantize respective SRPv values 110 for different sub-tiles or fragments of each primitive 22 to define SRP values per fragment (SRPf) 118. Pixel shader stage 96 then launches respective threads and performs variable rate shading per fragment of one or more primitives 22 based on each respective SRPf 118, thereby shading variable-area color fragments for use in rendering image 24.

As described further herein, the rasterizer stage 94 can record metadata 123 related to pixels that are written as a result of performing the variable rate shading. For example, based on the shading rate for a given fragment, only a subset of pixels (e.g., anchor pixels) corresponding to a subset of samples of the fragment having color may actually be modified during the pixel shader stage 96. In one example, remaining pixels may be determined as a result of broadcasting the shaded sample/pixel to a nearby pixel (e.g., nearby in a coordinate space). For instance, given a 2 pixel by 2 pixel fragment (e.g., a tile) having a variable shading rate of ¼, a top left pixel may be shaded and thus is considered the sample or anchor pixel, while the remaining 3 pixels may copy the value of the sample or anchor pixel and thus be considered broadcast pixels.

The rasterizer stage 94 may also update metadata 123 related to pixels that are modified as a result of performing variable rate shading. For example, a previous primitive may write one or more anchor pixels and zero or more broadcast pixels. Subsequently these pixels may be overwritten by another primitive. In the event that an anchor pixel is overwritten, any broadcast pixels that reference this anchor pixel, when themselves are not overwritten, can be referred to as orphaned (or "orphan pixels" herein). The metadata 123 may accordingly identify pixels as anchor pixels, broadcast pixels, and/or orphan pixels. Furthermore, if a single anchor pixel having two or more broadcast pixels becomes orphaned, one pixel may be selected as the orphan pixel, and/or one or more remaining broadcast pixels may be reassigned as broadcast copies of the new orphan pixel. Metadata 123 may therefore record one of three fundamental states for each pixel, anchor pixel (e.g., a pixel written by the pixel shader stage 96), broadcast pixel (a copy of an anchor pixel), or orphan pixel (a broadcast pixel whose associated anchor pixel was overwritten).

In any case, deferred passes stage 101 can perform one or more additional deferred passes (e.g., for lighting, screen space effects such as ambient occlusion, reflections, sub surface scattering, shadow accumulation, etc.) on the subset of modified pixels without necessarily also performing deferred passes on the other (e.g., broadcast or otherwise) pixels of the fragment. Specifically, for example, the one or more additional deferred passes may include a screen-space decal stage, a screen-space ambient occlusion stage, a screen-space global illumination stage, a screen-space reflection stage, a screen-space shadow stage, a screen-space sub-surface scattering stage, a screen-space shadow accumulation stage, or rendering atmospheric effects, such as sky, fog, etc. Thus efficiency can be achieved by not performing deferred shading processing on all pixels, as it can be desirable to perform deferred shading on only the anchor and orphan pixels (e.g., if only a portion of the pixels are to be shaded).

Figure 3:
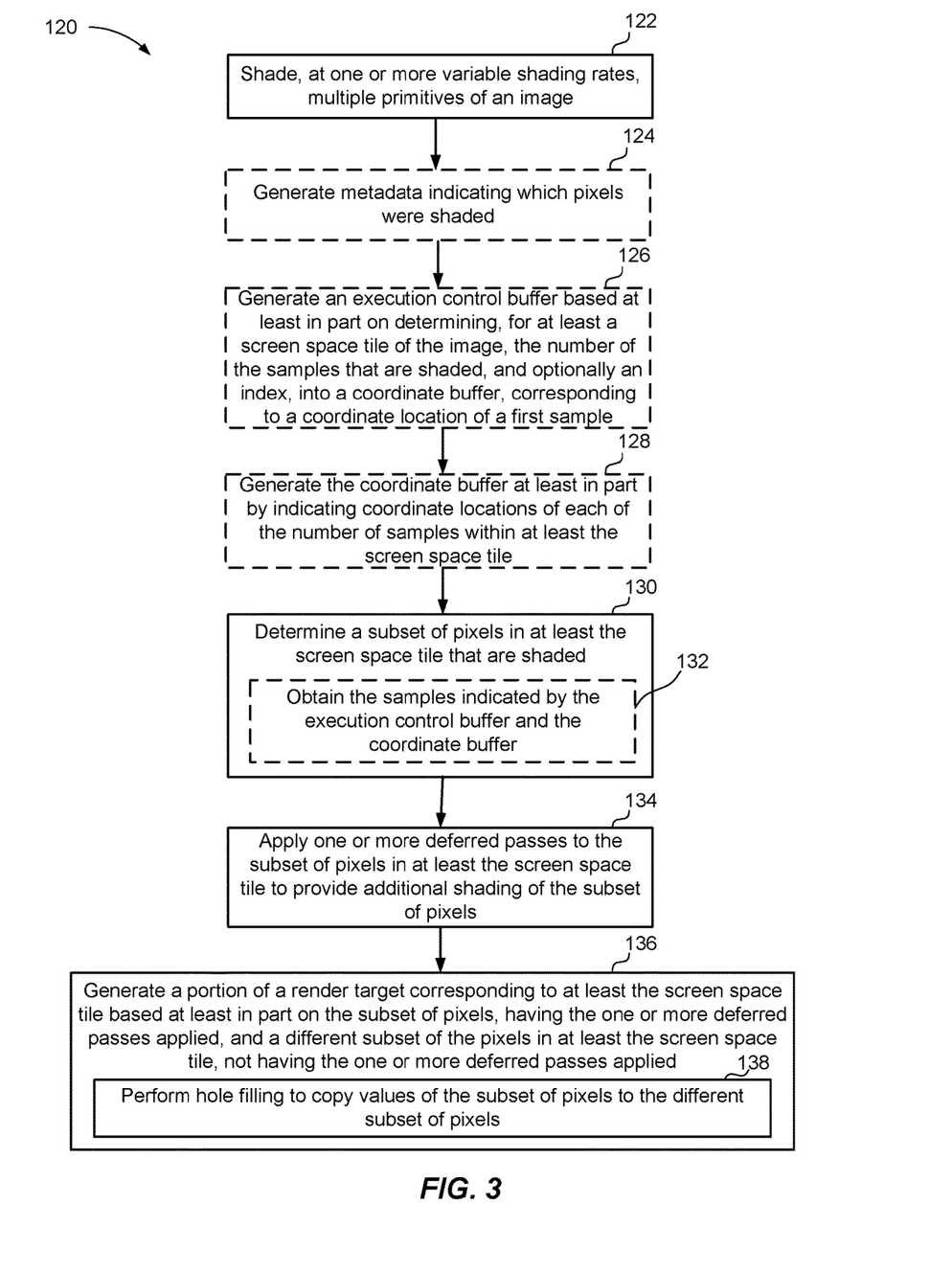
FIG. 3 is a flowchart of an example of a method of performing variable rate deferred passes according to the described examples.
Figure 4:
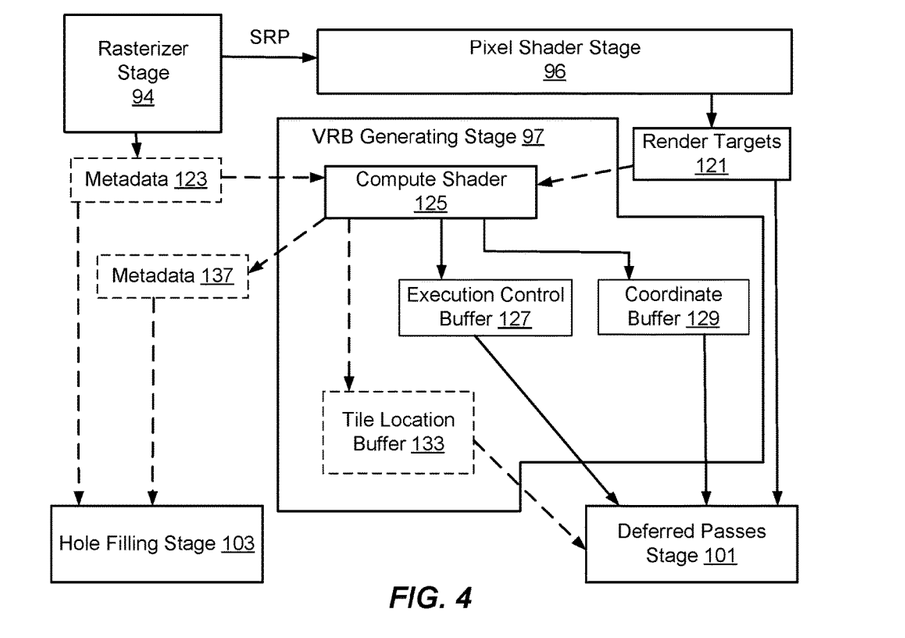
FIG. 4 is a schematic diagram of an example of a pixel shader stage component and subcomponents associated with the operation of the pixel shader stage in the method of FIG. 3.
Figure 5:
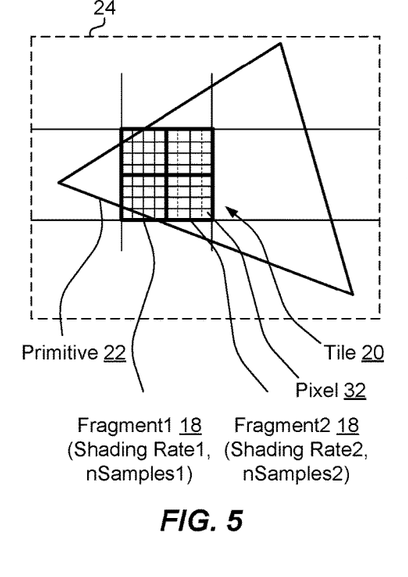
FIG. 5 is a schematic diagram of an example of a primitive of an image, and fragments covered by the primitive according to the described examples.
Figure 6:
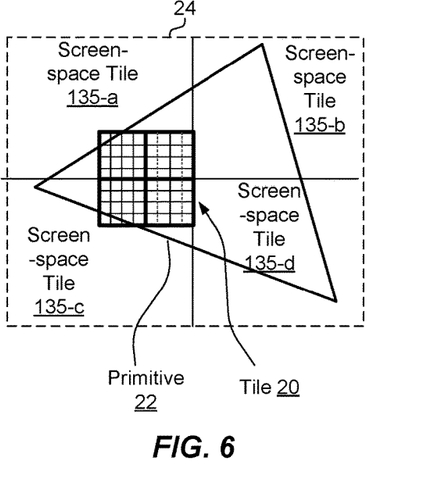
FIG. 6 is a schematic diagram of an example of a primitive of an image, and screen-space tiles covered by the primitive according to the described examples.

Referring to FIGS. 3 and 4, one example of operating graphics pipeline 14 to perform variable shading rate-based deferred rendering as described herein may be explained with reference to a method 120 of rendering graphics in FIG. 3, and with reference to image 24 and corresponding components of pixel shader stage 96 of FIGS. 4-6. In particular, image 24 includes one or more primitives 22 covering one or more tiles 20, which may include one or more fragments 18 (e.g., sub-tile1 and sub-tile2) per tile 20 and/or one or more pixels 32 that are operated on by pixel shader stage 96. Additionally, in the variable shading rate-based deferred rendering process described herein, image 24 may be divided up into different screen-space tiles 135-*a*, 135-*b*, 135-*c*, 135-*d*, which may or may not correspond to tiles 20 or fragments 18 operated on by pixel shader stage 96, as described in more detail below. For example, a screen-space tile 135-*a* may be a same or different size than the fragments 18, may encompass all or part of a fragment 18 (or related pixels 32) or more than one fragment (or related pixels 32), etc.

At 122, method 120 includes shading, at one or more variable shading rates, multiple primitives of an image. In an example, graphics pipeline 14 and/or pixel shader stage 96, may be configured to shade, at the one or more variable shading rates, the multiple primitives 22 of the image 24 (e.g., shown in FIG. 5). For example, referring to FIG. 2, a rasterizer stage 94 can receive primitives 22 from other stages, as described, and can generate SRPf values corresponding to variable rate shading to be performed for a fragment (e.g., a tile, a sub-tile, a quad, a pixel, or a sub-pixel region, etc.), which the rasterizer stage 94 can provide to the pixel shader stage 96 for shading pixels (e.g., pixels 32) in the fragment corresponding to the one or more primitives 22. The pixel shader stage 96 can receive one or more shading parameters (and related values) for each of the primitives 22, such as one or more SRPs. As described, for example, the pixel shader stage 96 can receive the shading rate (per fragment) from the rasterizer stage 94, where the shading rate (e.g., SRPf) can indicate a shading rate for each pixel, or subsets of pixels, in the fragment (e.g., a number of samples per quad over which to perform shading), and one or more of the shaded samples can be broadcast into other pixels in a quad, as described. In one example, pixel shader stage 96 can shade a given primitive 22 by shading a subset of pixels (e.g., samples or anchor pixels) in a fragment 18 corresponding to the primitive 22, where the subset of pixels are determined based on the shading rate, and broadcasting the shaded value of a given pixel to one or more other pixels. Moreover, for example, shading the subset of pixels can include pixel shader stage 96 storing the set of pixels of a fragment, and/or related parameter values, in one or more render targets 121, which may be stored in a render target buffer 108.

Optionally, at 124, method 120 includes generating metadata indicating which pixels were shaded. In an example, graphics pipeline 14 and/or rasterizer stage 94, and/or output merger stage 98 and/or a compute shader, may be configured to generate the metadata 123 indicating which pixels were shaded (e.g., using one or more variable shading rates in the shading performed at 122). Rasterizer stage 94 and/or output merger stage 98, in this example, may store information regarding the pixels that were shaded in metadata 123 as an optional enhancement to provide such information for performing variable rate deferred passes. For example, the shading rate (e.g., SRPf) can indicate a shading rate for each pixel, or subsets of pixels. In an example, the shading rate can indicate a number of samples per quad (e.g., 2×2 quad of pixels, although other sized quads may be used) over which to perform shading, where one or more of the shaded samples can be broadcast into other pixels in a quad by the pixel shader stage 96, output merger stage 98, etc., as described. Thus, in one example, rasterizer stage 94, and/or pixel shader stage 96 and/or output merger stage 98 can determine the pixels that were shaded based on generated SRPf, and can accordingly store information regarding pixel state within the metadata 123.

In an example, method 120 can optionally include, at 126, generating an execution control buffer based at least in part on determining, for at least a screen-space tile of the image, the number of the samples that are shaded, and optionally an index, into the coordinate buffer, corresponding to a coordinate location of a first sample. In an example, graphics pipeline 14 and/or compute shader 125, may be configured to generate the execution control buffer (e.g., execution control buffer 127) based at least in part on determining, for at least the screen-space tile (e.g., screen-space tile 135-*a*, 135-*b*, 135-*c*, and/or 135-*d* in FIG. 6) of the image 24, the number of the samples that are shaded, and optionally an index, in a coordinate buffer, of a coordinate location of the first sample, where the coordinate buffer 129 can include the coordinate location of each sample that was shaded, as described further herein. For example, graphics pipeline 14 and/or compute shader 125, can generate the execution control buffer 127 to indicate the number of samples (e.g., anchor/orphan pixels) in the variable rate shading performed by the pixel shader stage 96, since as described, not all pixels may have been shaded when performing the variable rate shading. For example, as described further herein, rasterizer stage 94 and/or pixel shader stage 96 and/or output merger stage 98 can output information regarding the samples in metadata 123, and the graphics pipeline 14 and/or compute shader 125, can generate the execution control buffer 127, and coordinate buffer 129, as described further below, based at least in part on the metadata 123 indicating which pixels were shaded. In another example, graphics pipeline 14 and/or compute shader 125, can generate the execution control buffer 127, and coordinate buffer 129, as described further below, based on the render target(s) 121 generated by pixel shader stage 96 in the render target buffer 108 (e.g., based on determining a number of adjacent pixels having the same value). The execution control buffer 127 can also indicate the index of the first sample, which may include an index into a coordinate buffer 129 corresponding to the first sample, which may be based on whether the coordinate buffer 129 is to be compacted, as described further herein. Thus, given the number of samples and the location of the first sample, coordinate locations of all the samples (e.g., shaded or anchor/orphan pixels) in the screen-space tile 135-*a*, 135-*b*, 135-*c*, and/or 135-*d* can be determined. Graphics pipeline 14 and/or compute shader 125 can create the execution control buffer 127, and coordinate buffer 129, as described further below, in a VRB 113 in graphics memory 58.

In another example, method 120 may optionally include, at 128, generating the coordinate buffer at least in part by indicating coordinate locations of each of the number of samples within at least the screen-space tile. In an example, graphics pipeline 14 and/or compute shader 125, may be configured to generate both the execution control buffer (e.g. execution control buffer 127) and coordinate buffer (e.g., coordinate buffer 129) at least in part by indicating coordinate locations of each of the samples within at least the screen-space tile 135-*a*, 135-*b*, 135-*c*, and/or 135-*d* (e.g., FIG. 6) of the image 24. For example, graphics pipeline 14 and/or compute shader 125, can generate the coordinate buffer 129 for the fragment pixels of the image, such as a 32×32 coarse tile of pixels, a 16×16 tile of pixels, an 8×8 tile of pixels, a 32×16 tile of pixels, etc. to include local coordinates of each sample (e.g., shaded pixel) in the tile. For example, for a 16×16 tile, having a total of 16 possible X coordinate values and 16 possible Y coordinate values for a given pixel, a 4 bit value can be used to represent each of the X and Y value, and thus the coordinate location can be stored using one byte of data. In one example, graphics pipeline 14, pixel shader stage 96, and/or compute shader 125 may generate the coordinate buffer 129 based at least in part on metadata 123 from the pixel shader stage 96 indicating which pixels were shaded during VRS. Graphics pipeline 14 and/or compute shader 125 can create the coordinate buffer 129 in a VRB 113 in graphics memory 58.

In a specific example, graphics pipeline 14 and/or compute shader 125, can generate the execution control buffer 127 and coordinate buffer 129 after pixel shader stage 96 performs the variable rate shading (but before running deferred passes). In one example of variable rate shading, the pixel shader stage 96 determines, for one or more subsets of pixels in the fragment 18, one or more pixels to shade, which is based on the shading rate. Generating the execution control buffer 127 and coordinate buffer 129, for example, can be in response to determining the number of samples that are shaded during the shading, whether from metadata 123 output from rasterizer stage 94, analyzing the render target 121 generated by pixel shader stage 96 to determine the anchor pixels and broadcast pixels (e.g., based on determine neighboring pixels with similar values), etc. In any case, graphics pipeline 14 and/or compute shader 125 can generate the execution control buffer 127 and coordinate buffer 129 including storing an indication of the number of samples that are shaded in the variable rate shading, and may also can include generating and storing an index to a location in the coordinate buffer where the coordinate locations of the first sample shaded are is stored. Additionally, generating the coordinate buffer 129, for example, can be in response to the number of samples that are shaded, where the coordinate buffer 129 is compacted, or can be based on a total number of pixels in the screen-space tile, where the coordinate buffer 129 is not compacted.

Where the coordinate buffer 129 is compacted, for example, compacting the coordinate buffer may be based on the number of samples that are shaded within the screen-space tile, and the respective coordinate locations in the screen-space tile corresponding to each of the samples can be contiguously stored in the coordinate buffer 129. In this example, graphics pipeline 14 and/or compute shader 125 can compact the coordinate buffer 129, and can generate the execution control buffer 127 to include the index of the coordinate location of the first sample for a given screen-space tile in the coordinate buffer 129. Where the coordinate buffer 129 is not compacted, for example, generating the coordinate buffer may be based on the total number of pixels, and the respective coordinate locations in the screen-space tile corresponding to each of the samples can be computed corresponding to the location of the screen-space tile. Thus, some entries in the coordinate buffer 129 in this example may not be used, and the index of the coordinate location of the first sample for a given screen-space tile may not need to be indicated but may be computed.

For example, given a subset of 4 pixels in a 2×2 quad in the fragment, the pixel shader stage 96 may select 1 of the pixels for shading based on a 1:4 shading rate for the given fragment. The rasterizer stage 94 can track the samples (e.g., written) in a given fragment, which can have been stored as surface metadata 123 at the rasterizer stage 94, pixel shade stage 96 or output merger stage 98. In this example, graphics pipeline 14 and/or compute shader 125, can process the surface metadata 123, and/or can process the render targets 121, to construct both the execution control buffer 127 and the coordinate buffer 129 for one or more screen-space tiles 135-a, 135-b, 135-c, 135-d, etc., where the screen-space tiles (e.g., in FIG. 6) may have one or more pixels in common with the shaded fragments 18 (e.g., in FIG. 5). In one example, each screen-space tile can have a corresponding entry in the execution control buffer 127 and one or more associated entries in the coordinate buffer 129.

In some examples, metadata 123 may include information uniquely identifying each anchor, broadcast, and orphan pixel in the image, and further, for broadcast pixels, which anchor pixel of which they are a copy (e.g., from which the broadcast pixels are broadcast). In another example, metadata 123 may include minimum and/or maximum shading rate written by any primitive that covered a fragment. This information may be used by computer shader 125 to reduce the number of subsequent comparison operations performed on the render targets 121. For example, if a fragment was covered only by maximum shading rate primitives, every pixel could be known to be an anchor pixel, and no comparison of pixel values may be used for that fragment. In another example, the metadata 123 may instead include the minimum and/or maximum shading rate in each of the x and y axis. This may enable a reduction in pixel comparison operations per axis. In both schemes, when shading primitives, the metadata 123 per fragment may increase, except when the entire fragment is covered by a single primitive, at which time the minimum and/or maximum shading rate stored in metadata 123 may be reset to correspond to the shading rate of the primitive.

In a further specific example, compute shader 125 can run a 64-wide thread vector per tile, where each thread in the thread vector executes for one of 64 quads (e.g., 2×2 pixel quad) in the 16×16 tile of pixels. For example, a thread vector can include a plurality of lanes (e.g., threads) for independent or parallel execution of given instructions. The number of lanes can correspond to a work unit size of the thread vector (e.g., work unit size of 64). In this example, each thread can sum the number of samples for its quad based on the surface metadata 123, render targets 121, and/or derived data, and compute shader 125 can determine the total number of anchor or orphan pixels by performing a cross lane sum of the number of anchor or orphan pixels summed at each thread. Each thread of vectors can issue a single atomic instruction to reserve space in the coordinate buffer 129, and a cross lane compaction step can be performed so each active sample can obtain a unique index into the coordinate buffer 129 for writing up to 4 X/Y coordinates per lane corresponding to the samples (e.g., shaded pixels) of the quad. Compute shader 125 can write, to the execution control buffer 127, the total number of samples and the start location within the coordinate buffer 129 of the first sample. In another example, there may not be a compaction step, and the execution control buffer 127 can include the number of samples to shade, but no first index into the coordinate buffer 129.

The examples above provide one specific format of variable rate buffers for indicating samples in the screen-space tile that are shaded by variable rate shading. In other examples, other forms of VRBs may be recorded to identify each sample, and the VRBs can be used at later stages to apply one or more deferred passes to the samples based on identifying the samples, as described further herein.

At 130, method 120 includes determining a subset of pixels in at least the screen-space tile that are shaded. In an example, graphics pipeline 14, pixel shader stage 96, rasterizer stage 94, and/or deferred pass compute shader(s) 131, can determine the subset of pixels in at least the screen-space tile (e.g., screen-space tile 135-a, 135-b, 135-c, 135-d in FIG. 6, etc.) that are shaded (e.g., pixels that are shaded in corresponding fragments 18 (e.g., in FIG. 5) during the variable rate shading). For example, graphics pipeline 14, pixel shader stage 96, and/or deferred pass compute shader(s) 131, can determine the subset of pixels that are shaded (e.g., anchor and orphan pixels) based at least in part on metadata and/or in part on render targets 121 generated by the graphics pipeline 14, pixel shader stage 96 rasterizer stage 94, output merger stage 98, etc., based on performing variable rate shading. Thus, for example, determining the subset of pixels may optionally include, at 132, obtaining the samples indicated by the execution control buffer and the coordinate buffer. In an example, graphics pipeline 14 and/or deferred pass compute shader(s) 131, can obtain the samples indicated by the execution control buffer 127 and the coordinate buffer 129, where the samples correspond to the subset of pixels that are shaded. For example, graphics pipeline 14 and/or deferred pass compute shader(s) 131, can determine the samples based at least in part on determining the number of samples and an index of the first sample, as indicated by the execution control buffer 127, and determining the coordinate locations of the first sample, and subsequent samples (based on the number of samples) within a corresponding screen-space tile 135-a, 135-b, 135-c, 135-d, etc.

In an example, the render target 121 may include a shaded fragment of the image that is shaded, where the shaded fragment count can be of a less than or equal to size of the screen-space tile 135-a, 135-b, 135-c, 135-d, etc., for which the subset of pixels are determined. In a specific example of render target 121 storing a 32×32 pixels, where 455 have been shaded, the execution control buffers 127 for the corresponding screen-space tiles (e.g., 16×16 screen-space tiles) may include the following values:

| numSamples = 45 | numSamples = 50 |
| xyBufferOffset = 0 | xyBufferOffset = 45 |
| numSamples = 200 | numSamples = 160 |
| xyBufferOffset = 95 | xyBufferOffset = 295 | where numSamples is the number of samples in the screen-space tile, and xyBufferOffset is the index of the first sample, corresponding to the execution control buffer 127, in the coordinate buffer 129. Accordingly, for each 16×16 screen-space tile in the 32×32 shaded fragment, graphics pipeline 14, pixel shader stage 96, and/or deferred pass compute shader(s) 131, can determine the first sample coordinate location based on the xyBufferOffset and the corresponding entry in the coordinate buffer 129, and can determine the number of samples for which to obtain coordinate locations in the coordinate buffer 129 to a given deferred pass. In the above example, one 64-wide thread vectors can be used to process the first 45 samples, one 64-wide thread vector can be used to process the next 50 samples, four 64-wide thread vectors (e.g., 3 full thread vectors and a partial thread vector) can be used to process the next 200 samples, and three 64-wide thread vectors (e.g., 2 full thread vectors and a partial thread vector) can be used to process the last 160 samples.

At 134, method 120 includes applying one or more deferred passes to the subset of pixels in at least the screen-space tile to provide additional shading of the subset of pixels. In an example, graphics pipeline 14, pixel shader stage 96, and/or deferred pass compute shader(s) 131, can apply the one or more deferred passes to the subset of pixels in at least the screen-space tile 135-a, 135-b, 135-c, 135-d, etc., to provide additional shading of the subset of pixels. For example, graphics pipeline 14, pixel shader stage 96, and/or deferred pass compute shader(s) 131, can apply the one or more deferred passes as additional lighting stages, screen space effects stages, such as ambient occlusion stages, reflections stages, sub surface scattering stages, shadow accumulation stages, etc., and can apply the one or more deferred passes to the subset of pixels indicated as being shaded in the variable rate shading, without necessarily applying the one or more deferred passes to one or more other subsets of pixels in the screen-space tile. For example, as described, deferred pass compute shader(s) 131, can determine the subset of pixels to which to apply the one or more deferred passes based at least in part on the metadata from the variable rate shading (e.g., the execution control buffer 127 and coordinate buffer 129). In one example, deferred pass compute shader(s) 131 can include multiple shaders each for a given deferred pass (e.g., one deferred pass compute shader 131 for lighting, one deferred pass compute shader 131 for shadowing accumulation, etc.), and each deferred pass compute shader 131 can shade the subset of pixels in a screen-space tile (e.g., based on information in one or more VRBs, such as the execution control buffer 127 and coordinate buffer 129). In addition, for example, the deferred pass compute shader(s) 131 can store the subset of pixels having the deferred pass(es) applied in the same location within the screen-space tile 135-a, 135-b, 135-c, 135-d, etc. (e.g., as determined from the coordinate buffer 129).

For example, this can provide efficiency in applying the deferred passes by shading only the pixels that were written in the variable rate shading, e.g., the anchor and orphan pixels. In a specific example, for a screen-space tile that is a 16×16 tile of pixels, a deferred pass compute shader 131 can use four 64-wide thread vectors can be used to process each pixel of the screen-space tile. For example, each of the four thread vectors can determine the portion of the screen-space tile on which they are to operate (e.g., as a regular grid). Instead of immediately processing pixels, in an example, each thread vector can look up the execution control buffer 127, and can also determine whether it is the 1st, 2nd, 3rd or 4th thread vector in the 16×16 screen-space tile. Based on this determination and the number of samples in the tile (e.g., according to the indication in the execution control buffer 127), the thread vector can either pick up between 1 and 64 pixels to process (e.g., based on determining whether the index of the thread vector multiplied by 64 is greater than or equal to the number of samples in the screen-space tile), or can terminate if there are no pixels to process, returning execution resources back to the GPU for re-use, which can provide efficiency in performance. For a thread vector that does not terminate, for example, the thread vector can determine an index into the coordinate buffer 129 based at least in part on that indicated in the execution control buffer 127, where the coordinates are obtained for each pixel the deferred pass compute shader 131 is to process. In another example, deferred pass compute shader 131 or the GPU's command processor can read the execution control buffer 127 and determine a number of thread vectors to initialize based on the number of samples indicated in the execution control buffer 127.

At 136, method 120 includes generating a portion of a render target corresponding to at least the screen-space tile based at least in part on the subset of pixels, having the one or more deferred passes applied, and a different subset of the pixels in at least the screen-space tile, not having the one or more deferred passes applied. In an example, graphics pipeline 14, pixel shader stage 96, and/or deferred passes stage 101 can generate the portion of the render target 121 corresponding to at least the screen-space tile 135-a, 135-b, 135-c, 135-d, etc. based at least in part on the subset of pixels, having the one or more deferred passes applied, and the different subset of pixels in at least the screen-space tile, not having the one or more deferred passes applied. In one example, graphics pipeline 14 and/or pixel shader stage 96 and/or deferred passes stage 101 can generate the portion of multiple render targets 121 that can have different deferred passes applied, where the deferred passes are applied only to the subset of pixels in a screen-space tile that are shaded in the variable rate shading, as indicated in the one or more VRBs (e.g., in the execution control buffer 127 and coordinate buffer 129). Graphics pipeline 14 and/or deferred passes stage 101 can store the portion of the render target in render target buffer 108.

In addition, in one example, the compute shader 125 can generate the execution control buffer 127 and coordinate buffer 129 for each of multiple screen-space tiles (e.g., screen-space tiles over the entire image 24) before applying the one or more deferred passes. In this example, compute shader 125 can generate a tile location buffer 133, which can indicate the screen-space tiles locations within the image 24 for which the subsets of pixels that have been shaded have been determined (e.g., and corresponding execution control buffer 127 and coordinate buffer 129 have been generated). In addition, for example, compute shader 125 may indicate a number of thread vectors needed to process the multiple screen-space tiles. Deferred passes stage 101 can accordingly apply the one or more deferred passes over the multiple screen-space tiles after determining the subsets of pixels for each of the multiple screen-space tiles, the number of thread vectors to be used in running deferred passes over the subsets of pixels for the multiple screen-space tiles, etc.

In one example, generating the portion of the render target at 136 may optionally include, at 138, performing hole filling to copy values of the subset of pixels to the different subset of pixels. In an example, graphics pipeline 14 and/or hole filling stage 103 can perform the hole filling to copy values of the subset of pixels to the different subset of pixels. In an example, for a given fragment, hole filling stage 103 can determine which pixels are anchor or orphan pixels (e.g., and had deferred passes applied in the deferred passes stage 101), and can copy values of the anchor or orphan pixel(s) to the remaining broadcast pixels in the fragment. In one example, hole filling stage 103 may determine which pixels of a given screen-space tile are anchor or orphan pixels in their respective fragment (e.g., quad) based on metadata 123 generated by rasterizer stage 94, as described previously and/or by a compute shader 125 and render targets 108, which may generate metadata 137 for the propose of hole filling.

Figure 7:
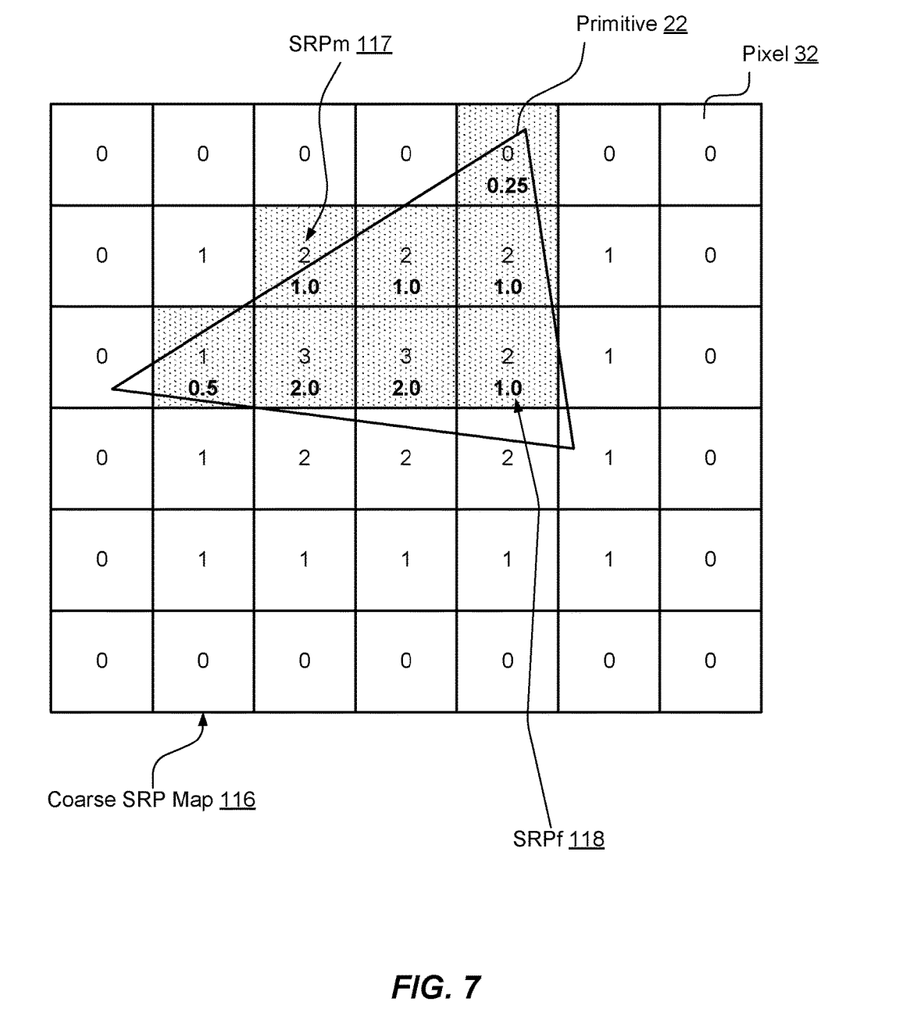
FIG. 7 is an example of calculating fragment variable SRP values for fragments of a coarse SRP map during a rasterization stage in a graphics pipeline according to the described examples.

FIG. 7 illustrates an example of performing variable rate shading. In one example, performing variable rate shading, as described herein, may include looking up a coarse SRP map 116 to obtain SRPm 117 for a given pixel. For example, in an example, graphics pipeline 14 executes rasterizer stage 94 to look up the SRP map to obtain SRPm, such that, one or more look up values in a SRP map 116 (SRPm 117) may be identified for one or more pixels 32 within one or more primitives 22 of one or more objects based at least on coarse texture map coordinates. In an example, the looked up SRPm can be added to a base shading rate for the pixel stored in a register to produce the final SRP value for the relevant fragments within the designated screen-space tiles (e.g., screen-space tiles 135-a, 135-b, 135-c, 135-d, etc. in FIG. 4).

In an example, the map coordinates include coarse screen position coordinates (X, Y) of each pixel. In an example, fine scan conversion can be performed to determine sample positions covered within the current fragment (or pixel). Further, in this example, in order to calculate the respective SRPf 118, graphics pipeline 14 can execute rasterizer stage 94 to perform a fine scan conversion to determine the respective SRPf 118 using each of the one or more pixels 32 of the one or more primitives using interpolators and SRPm 117. For example, in an example, rasterizer stage 94 may include a fine rasterizer stage configured to perform this functionality. In particular, in an example, for each pixel 32, graphics pipeline 14 can execute rasterizer stage 94 to calculate respective pixel variable SRP values (SRPf 118) based on a base shading rate and a lookup value (e.g., SRPm 117) corresponding to the pixel 32. In an example, fragment variable SRP values for fragments of a coarse SRP map may be calculated based on the function:

$$SRPf = BSR \times 2^{SRPm[x,y]}$$

where BSR corresponds to the base shading rate for the specific pixel 32, and SRPm[x,y] corresponds to the lookup value for the specific pixel 32. In some examples, the base shading rate may correspond to a previous SRPf that is multiple by $2^{SRPm[x,y]}$.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various examples are described herein in connection with a device (e.g., computer device 10), which can be a wired device or a wireless device. Such devices may include, but are not limited to, a gaming device or console, a laptop computer, a tablet computer, a personal digital assistant, a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various examples or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some examples, the processor and the storage medium may reside in an ASIC. Additionally, the ASIC may reside in a computer device (such as, but not limited to, a game console). In the alternative, the processor and the storage medium may reside as discrete components in a user terminal. Additionally, in some examples, the steps and/or actions of a method or algorithm may reside as one or any combination or set of codes and/or instructions on a machine readable medium and/or computer readable medium, which may be incorporated into a computer program product.

In one or more examples, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While examples of the present disclosure have been described in connection with examples thereof, it will be understood by those skilled in the art that variations and modifications of the examples described above may be made without departing from the scope hereof. Other examples will be apparent to those skilled in the art from a consideration of the specification or from a practice in accordance with examples disclosed herein.

What is claimed is:

1. A method for performing pixel shading in graphics processing, comprising:

shading, by a graphic processing unit (GPU) and at one or more variable shading rates, multiple primitives of an image;

generating, for at least one screen-space tile corresponding to a portion of the image, a coordinate buffer including respective coordinate locations in the portion of the image, wherein each of the respective coordinate locations corresponds to a subset of pixels of one of a number of samples in the image that are shaded in the shading at the one or more variable shading rates;

generating an execution control buffer in response to the number of samples that are shaded during the shading, including at least one of storing an indication of the number of samples that are shaded, and generating and storing an index to one of the respective coordinate locations in the coordinate buffer for each of the number of samples that are shaded;

determining, by the GPU, one or more of the subsets of pixels, in the at least one screen-space tile corresponding to the portion of the image, corresponding to the number of samples that are shaded in the shading at the one or more variable shading rates, wherein the one or more of the subsets of pixels are less or equal to all pixels in the at least one screen-space tile, wherein determining the one or more of the subsets of pixels is based at least in part on:

obtaining, for the at least one screen-space tile, values in the execution control buffer indicating the number of samples that are shaded in the at least one screen-space tile; and obtaining, for the at least one screen-space tile, the coordinate buffer of each of the number of samples mapped to the respective coordinate locations in the image corresponding to each of the one or more of the subsets of pixels;

applying, by the GPU, one or more deferred passes to the one or more of the subsets of pixels in the at least one screen-space tile to provide additional shading of the one or more of the subsets of pixels; and generating, by the GPU, a portion of a render target corresponding to the at least one screen-space tile having the one or more deferred passes applied.

2. The method of claim 1, wherein determining the one or more of the subsets of pixels that are shaded in the at least one screen-space tile comprises determining coordinate locations of each of the one or more of the subsets of pixels based at least in part on the respective coordinate locations of each of the number of samples from the execution control buffer and mapping of the samples to the coordinate locations in the image from the coordinate buffer.

3. The method of claim 2, wherein applying the one or more deferred passes comprises:
   initializing multiple thread vectors for applying the one or more deferred passes for each pixel in the one or more of the subsets of pixels, wherein each of the multiple thread vectors includes a work unit size, and wherein a number of the multiple thread vectors is based on a size of the at least one screen-space tile and the work unit size;
   determining at least a portion of the multiple thread vectors having a number of pixels of the one or more of the subsets of pixels within a respective work unit size;
   terminating a remaining portion of the multiple thread vectors not having any of the one or more of the subsets of pixels within the respective work unit size; and
   executing at least the portion of the multiple thread vectors to apply the one or more deferred passes to the one or more of the subsets of pixels.

4. The method of claim 1, further comprising determining the number of samples that are shaded during the shading based on at least one of metadata generated as part of the shading or analyzing a shaded render target generated based on the shading.

5. The method of claim 1, wherein determining the one or more of the subsets of pixels that are shaded in the at least one screen-space tile comprises determining multiple subsets of pixels that are shaded in multiple screen-space tiles of the image, and indicating a location of the multiple subsets of pixels in a coordinate buffer, and wherein applying the one or more deferred passes comprises applying the one or more deferred passes to the multiple subsets of pixels in the multiple screen-space tiles based on determining the location of the multiple subsets of pixels from the coordinate buffer.

6. The method of claim 1, wherein the one or more deferred passes comprise at least one of a deferred lighting stage, a screen-space decal stage, a screen-space ambient occlusion stage, a screen-space global illumination stage, a screen-space reflection stage, a screen-space shadow stage, a screen-space sub-surface scattering stage, a screen-space shadow accumulation stage, or rendering atmospheric effects.

7. The method of claim 1, wherein generating the portion of the render target comprises copying values of the one or more of the subsets of pixels to a different subset of pixels in the at least one screen-space tile.

8. A computer device, comprising:
   a memory; and
   a graphics processing unit (GPU) in communication with the memory, wherein the GPU is configured to:
      shade, at one or more variable shading rates, multiple primitives of an image;
      generate, for at least one screen-space tile corresponding to a portion of the image, a coordinate buffer including respective coordinate locations in the portion of the image, wherein each of the respective coordinate locations corresponds to a subset of pixels of one of a number of samples in the image that are shaded in the shading at the one or more variable shading rates;
      generate an execution control buffer in response to the number of samples that are shaded during the shading, including at least one of storing an indication of the number of samples that are shaded, and generating and storing an index to one of the respective coordinate locations in the coordinate buffer for each of the number of samples that are shaded;
      determine one or more of the subsets of pixels, in the at least one screen-space tile corresponding to the portion of the image, corresponding to the number of samples that are shaded in the shading at the one or more variable shading rates, wherein the one or more of the subsets of pixels are less than or equal to all pixels in the at least one screen-space tile, wherein the GPU is configured to determine the one or more of the subsets of pixels based at least in part on:
         obtaining, for the at least one screen-space tile, values in the execution control buffer indicating the number of samples that are shaded in the at least one screen-space tile; and
         obtaining, for the at least one screen-space tile, the coordinate buffer of each of the number of samples mapped to the respective coordinate locations in the image corresponding to each of the one or more of the subsets of pixels;
      apply one or more deferred passes to the one or more of the subsets of pixels in the at least one screen-space tile to provide additional shading of the one or more of the subsets of pixels; and
      generate a portion of a render target corresponding to the at least one screen-space tile having the one or more deferred passes applied.

9. The computer device of claim 8, wherein the GPU determines the one or more of the subsets of pixels that are shaded in the at least one screen-space tile at least in part by determining coordinate locations of each of the one or more of the subsets of pixels based at least in part on the respective coordinate locations of each of the number of samples from the execution control buffer and mapping of the samples to the coordinate locations in the image from the coordinate buffer.

10. The computer device of claim 9, wherein the GPU applies the one or more deferred passes at least in part by:
   initializing multiple thread vectors for applying the one or more deferred passes for each pixel in the one or more of the subsets of pixels, wherein each of the multiple thread vectors includes a work unit size, and wherein a number of the multiple thread vectors is based on a size of the at least one screen-space tile and the work unit size;
   determining at least a portion of the multiple thread vectors having a number of pixels of the one or more of the subsets of pixels within a respective work unit size;
   terminating a remaining portion of the multiple thread vectors not having any of the one or more of the subsets of pixels within the respective work unit size; and
   executing at least the portion of the multiple thread vectors to apply the one or more deferred passes to the one or more of the subsets of pixels.

11. The computer device of claim 8, wherein the GPU determines the one or more of the subset of pixels that are shaded in the at least one screen-space tile at least in part by determining multiple subsets of pixels that are shaded in multiple screen-space tiles of the image, and indicating a location of the multiple subsets of pixels in a coordinate buffer, and wherein applying the one or more deferred passes comprises applying the one or more deferred passes to the multiple subsets of pixels in the multiple screen-space tiles based on determining the location of the multiple subsets of pixels from the coordinate buffer.

12. The computing device of claim 8, wherein the GPU is further configured to determine the number of samples that are shaded during the shading based on at least one of metadata generated as part of the shading or analyzing a shaded render target generated based on the shading.

13. The computing device of claim 8, wherein the one or more deferred passes comprise at least one of a deferred lighting stage, a screen-space decal stage, a screen-space ambient occlusion stage, a screen-space global illumination stage, a screen-space reflection stage, a screen-space shadow stage, a screen-space sub-surface scattering stage, a screen-space shadow accumulation stage, or rendering atmospheric effects.

14. The computing device of claim 8, wherein the GPU is configured to generate the portion of the render target based at least in part on copying values of the one or more of the subsets of pixels to a different subset of pixels in the at least one screen-space tile.

15. A non-transitory computer-readable medium storing computer-executable instructions executable by a processor for rendering graphics in a computer device, comprising:
    instructions for shading, by a graphic processing unit (GPU) and at one or more variable shading rates, multiple primitives of an image;
    instructions for generating, for at least one screen-space tile corresponding to a portion of the image, a coordinate buffer including respective coordinate locations in the portion of the image, wherein each of the respective coordinate locations corresponds to a subset of pixels of one of a number of samples in the image that are shaded in the shading at the one or more variable shading rates;
    instructions for generating an execution control buffer in response to the number of samples that are shaded during the shading, including at least one of storing an indication of the number of samples that are shaded, and generating and storing an index to one of the respective coordinate locations in the coordinate buffer for each of the number of samples that are shaded;
    instructions for determining, by the GPU, one or more of the subsets of pixels, in the at least one screen-space tile corresponding to the portion of the image, corresponding to the number of samples that are shaded in the shading at the one or more variable shading rates, wherein the one or more of the subsets of pixels are less than or equal to all pixels in the at least one screen-space tile, wherein the instructions for determining the one or more of the subsets of pixels are based at least in part on:
        instructions for obtaining, for the at least one screen-space tile, values in the execution control buffer indicating the number of samples that are shaded in the at least one screen-space tile; and
        instructions for obtaining, for the at least one screen-space tile, the coordinate buffer of each of the number of samples mapped to the respective coordinate locations in the image corresponding to each of the one or more of the subsets of pixels;
    instructions for applying, by the GPU, one or more deferred passes to the one or more of the subsets of pixels in the at least one screen-space tile to provide additional shading of the one or more of the subsets of pixels; and
    instructions for generating, by the GPU, a portion of a render target corresponding to the at least one screen-space tile having the one or more deferred passes applied.

16. The non-transitory computer-readable medium of claim 15, wherein the instructions for determining the one or more of the subsets of pixels that are shaded in the at least one screen-space tile comprise instructions for determining coordinate locations of each of the one or more of the subsets of pixels based at least in part on the respective coordinate locations of each of the number of samples from the execution control buffer and mapping of the samples to the coordinate locations in the image from the coordinate buffer.

17. The non-transitory computer-readable medium of claim 16, wherein the instructions for applying the one or more deferred passes comprise:
    instructions for initializing multiple thread vectors for applying the one or more deferred passes for each pixel in the one or more of the subsets of pixels, wherein each of the multiple thread vectors includes a work unit size, and wherein a number of the multiple thread vectors is based on a size of the at least one screen-space tile and the work unit size;
    instructions for determining at least a portion of the multiple thread vectors having a number of pixels of the one or more of the subsets of pixels within a respective work unit size;
    instructions for terminating a remaining portion of the multiple thread vectors not having any of the one or more of the subsets of pixels within the respective work unit size; and
    instructions for executing at least the portion of the multiple thread vectors to apply the one or more deferred passes to the one or more of the subsets of pixels.

18. The non-transitory computer-readable medium of claim 15, further comprising instructions for determining the number of samples that are shaded during the shading based on at least one of metadata generated as part of the shading or analyzing a shaded render target generated based on the shading.

19. The non-transitory computer-readable medium of claim 15, wherein the instructions for determining the one or more of the subsets of pixels that are shaded in the at least one screen-space tile comprise instructions for determining multiple subsets of pixels that are shaded in multiple screen-space tiles of the image, and instructions for indicating a location of the multiple subsets of pixels in a coordinate buffer, and wherein the instructions for applying the one or more deferred passes comprise instructions for applying the one or more deferred passes to the multiple subsets of pixels in the multiple screen-space tiles based on determining the location of the multiple subsets of pixels from the coordinate buffer.

20. The non-transitory computer-readable medium of claim 15, wherein the one or more deferred passes comprise at least one of a deferred lighting stage, a screen-space decal stage, a screen-space ambient occlusion stage, a screen-space global illumination stage, a screen-space reflection stage, a screen-space shadow stage, a screen-space sub-surface scattering stage, a screen-space shadow accumulation stage, or rendering atmospheric effects.

* * * * *